US010774888B2

(12) United States Patent
Dupas et al.

(10) Patent No.: US 10,774,888 B2
(45) Date of Patent: Sep. 15, 2020

(54) DRUM BRAKE PROVIDED WITH A MEMBER FOR HOLDING A BRAKE SEGMENT

(71) Applicant: Chassis Brakes International B.V., Eindhoven (NL)

(72) Inventors: Christophe Dupas, Palaiseau (FR); Gregory Tissier, Paris (FR); Cedric Guignon, Noiseau (FR)

(73) Assignee: Chassis Brakes International B.V., Eindhoven (NL)

( * ) Notice: Subject to any disclaimer, the term of this patent is extended or adjusted under 35 U.S.C. 154(b) by 52 days.

(21) Appl. No.: 15/024,950

(22) PCT Filed: Dec. 4, 2014

(86) PCT No.: PCT/FR2014/053161
§ 371 (c)(1),
(2) Date: Mar. 25, 2016

(87) PCT Pub. No.: WO2015/086958
PCT Pub. Date: Jun. 18, 2015

(65) Prior Publication Data
US 2016/0273598 A1  Sep. 22, 2016

(30) Foreign Application Priority Data
Dec. 9, 2013  (FR) .................................. 13 62316

(51) Int. Cl.
*F16D 65/09* (2006.01)
*F16D 51/28* (2006.01)
(52) U.S. Cl.
CPC ............ *F16D 65/091* (2013.01); *F16D 51/28* (2013.01)

(58) Field of Classification Search
CPC ............................... F16D 65/091; F16D 51/28
(Continued)

(56) References Cited

U.S. PATENT DOCUMENTS 2,111,297 A * 3/1938 Pontius, Jr. ........... F16D 65/091
188/340
3,108,659 A * 10/1963 Swift .................... F16D 65/091
188/2 R
(Continued)

FOREIGN PATENT DOCUMENTS

DE  9300423 U1  5/1994
DE  29721366 U1  2/1998
(Continued)

OTHER PUBLICATIONS

Written Opinion of the International Search Report PCT/ISA/210 for International Patent Application No. PCT/FR2014/053161 dated Aug. 11, 2015.
(Continued)

*Primary Examiner* — Thomas J Williams
*Assistant Examiner* — James K Hsiao
(74) *Attorney, Agent, or Firm* — Harness, Dickey & Pierce, P.L.C.

(57) ABSTRACT

The vehicle drum brake comprises a plate, at least one segment comprising a core and a brake lining, a spring able to keep the core of the segment in an axially balanced position, means for prestressing the spring wherein said means for prestressing the spring include stop means limiting the ability of the core of the segment to move axially.

14 Claims, 3 Drawing Sheets

Figure 1:
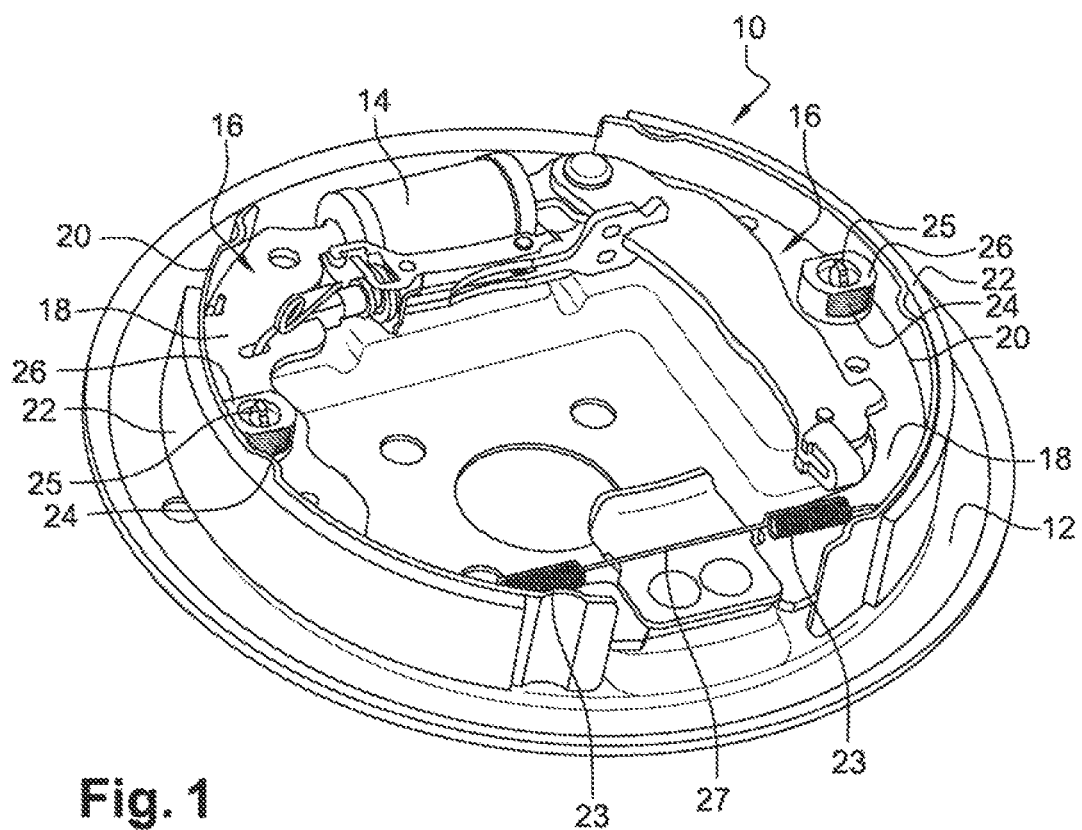

(58) Field of Classification Search
USPC .......................................................... 188/340
See application file for complete search history.

(56) References Cited

U.S. PATENT DOCUMENTS

| | | | | |
|---|---|---|---|---|
| 3,152,664 | A | * | 10/1964 | Swift .................... F16D 65/091 188/216 |
| 3,186,519 | A | * | 6/1965 | Johannesen ........... F16D 65/091 188/340 |
| 3,198,294 | A | * | 8/1965 | Stacy .................... F16D 65/092 188/234 |
| 3,337,007 | A | * | 8/1967 | Swift ...................... F16D 51/52 188/340 |
| 3,343,633 | A | * | 9/1967 | Kennel ................... F16D 51/52 188/78 |
| 3,548,976 | A | * | 12/1970 | Dombeck ............... F16D 51/24 188/340 |
| 3,554,330 | A | * | 1/1971 | Harrison ................. F16D 51/24 188/216 |
| 3,556,263 | A | | 1/1971 | Wieger |
| 3,576,237 | A | * | 4/1971 | Dubuc ................... F16D 51/24 188/206 A |
| 3,998,303 | A | | 12/1976 | Wunderlich |
| 5,368,139 | A | * | 11/1994 | Pirrallo ................ F16D 65/091 188/340 |
| 5,540,310 | A | * | 7/1996 | Ludtke .................... F16D 65/08 188/340 |
| 5,836,429 | A | * | 11/1998 | McGuire ............... F16D 65/091 188/340 |
| 6,062,354 | A | | 5/2000 | Pugh |
| 6,318,515 | B1 | * | 11/2001 | Pirrallo .................. F16D 51/16 188/78 |
| 6,343,678 | B1 | | 2/2002 | Barbosa |
| 2009/0183960 | A1 | | 7/2009 | Ikeda et al. |

FOREIGN PATENT DOCUMENTS

| | | |
|---|---|---|
| EP | 1136717 A2 | 9/2001 |
| EP | 2080924 A1 | 7/2009 |
| GB | 2000561 A | 1/1979 |
| JP | S48-077583 U | 9/1973 |
| JP | S5412073 A | 1/1979 |
| JP | S54-076178 U | 5/1979 |
| JP | H01-043237 Y2 | 12/1989 |

OTHER PUBLICATIONS

International Search Report PCT/ISA/210 for International Application No. PCT/FR2014/053161 dated Aug. 11, 2015.
Chinese Office Action dated Dec. 14, 2017 for corresponding Chinese Patent Application No. 2014800621920.8.
Japanese Office Action dated Nov. 20, 2018 for corresponding Japanese Patent Application No. 52882216.

* cited by examiner

DRUM BRAKE PROVIDED WITH A MEMBER FOR HOLDING A BRAKE SEGMENT

CROSS-REFERENCE TO RELATED APPLICATIONS

This application is the U.S. National Phase application of PCT Application No. PCT/FR2014/053161 filed on Dec. 4, 2014, which claims priority to French Application No, 1362316 filed on Dec. 9, 2013, the contents of each of which are incorporated herein by reference.

The invention relates to drum brakes for vehicles. Such brakes are commonly found on light vehicles such as motorcycles and city cars. This type of brake is also frequently used as a parking brake.

A drum brake comprises mainly a plate carrying the receiving cylinder of the brake control system, two segments carrying a brake lining and a drum mounted movably in rotation in relation to the plate. The drum is constrained to rotate with the hub of a wheel of the vehicle. When the user presses the brake pedal, the segments are actuated by an electric or hydraulic circuit and move apart to position the brake lining against an internal surface of the drum. The kinetic energy of the drum joined to the hub is transformed by friction into heat energy, thereby reducing the speed of the vehicle to a stop.

Currently, the segment carrying the brake lining is held in position in relation to the movement of same in a direction perpendicular to the plate by a spring.

Nonetheless, in the event of an impact on the wheel, in particular a side impact, or use of the brake, either several times in a short period of time or while the vehicle is on an inclined road, the segment may be moved significantly in relation to the plate. This means that the segment is no longer positioned in the normal position of same, and there is a risk that the braking system of the vehicle may cease to work correctly, adversely affecting the safety of the driver and passengers.

One purpose of the invention is to improve the hold of the segment in position in relation to the plate, in particular when braking.

To do so, the invention proposes a vehicle drum brake that comprises a plate, at least one segment comprising a core and a brake lining, a spring able to keep the core of the segment in an axially balanced position, means for prestressing the spring, said means for prestressing the spring comprising stop means limiting the ability of the core of the segment to move axially.

The stop means thus hold the segment when same moves away from the plate. They therefore keep the segment correctly positioned in the brake so that it works correctly even under the specific conditions described above. They also prevent the spring from being excessively compressed, thereby preventing same from being plastically—and therefore irreversibly—deformed.

According to one embodiment, said stop means include an axial skirt.

Such skirts constitute practical, cheap stop means.

Advantageously, said stop means include a washer rigidly attached to the skirt.

The washer makes it possible to hold the skirt in position. Preferably, the skirt and the washer form a single part. This means that the stop means are not bulky.

According to one embodiment, the prestressing means include a stud anchored to the plate by a first extremity, a second extremity of which defines an end-of-travel position for the washer.

This creates an end-of-travel position that cannot be passed.

Advantageously, the washer and one extremity of the stud have matching shapes.

If the segment moves significantly in relation to the plate, the mechanical stresses applied to the washer are more evenly distributed.

Preferably, the stud extends along a main axis of the skirt.

This also prevents the stop means from becoming bulky.

According to one embodiment, the skirt surrounds the spring.

This protects the spring.

Advantageously, the skirt has an opening at one of the extremities of same opposite the washer.

This arrangement reduces the size of the stop means.

Preferably, the stop means and the prestressing means are made of folded and/or stamped steel sheet.

These materials are lightweight, cheap and strong.

Figure 2:
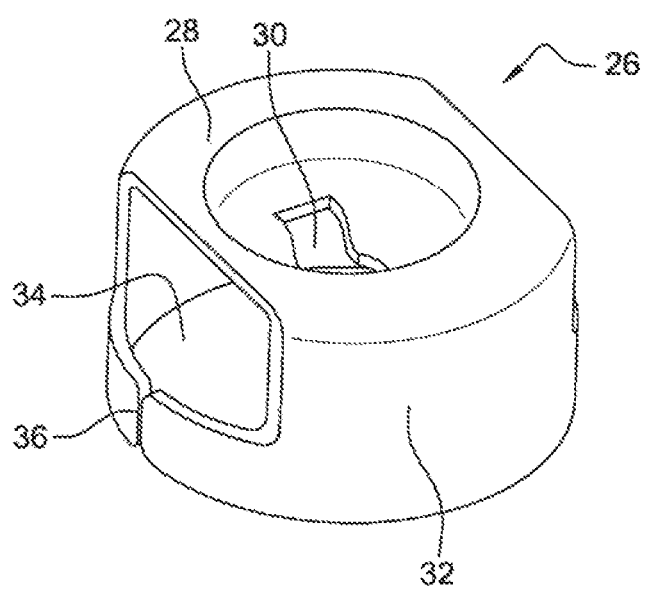
Figure 7:
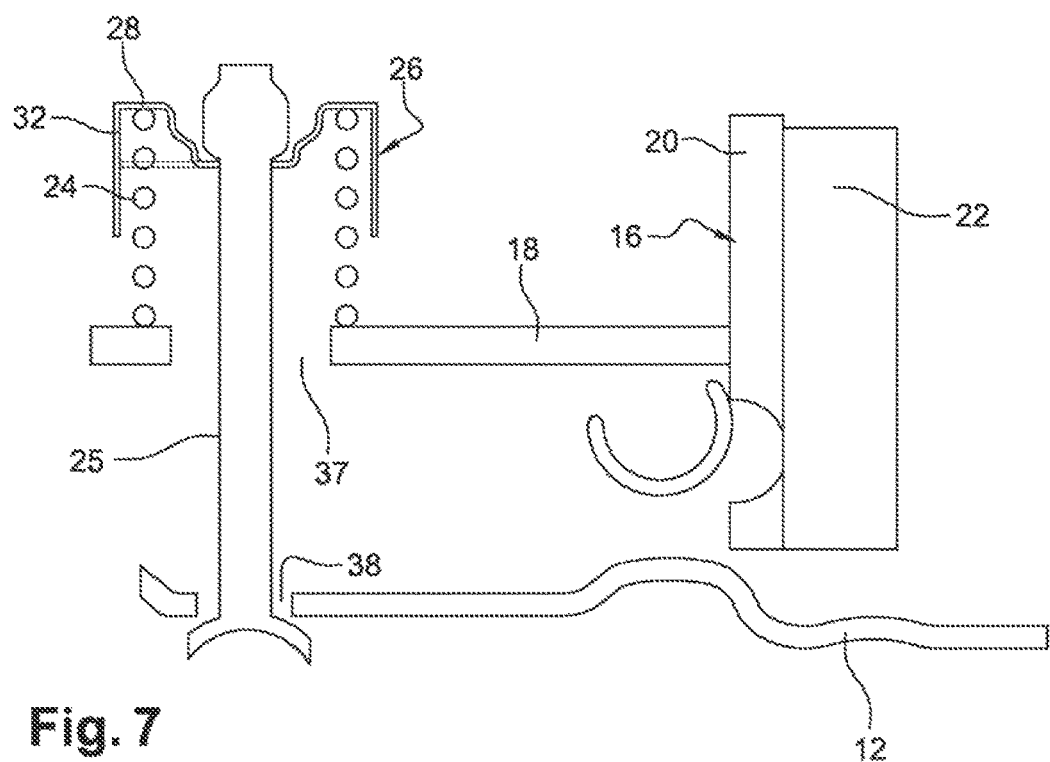
Figure 8:
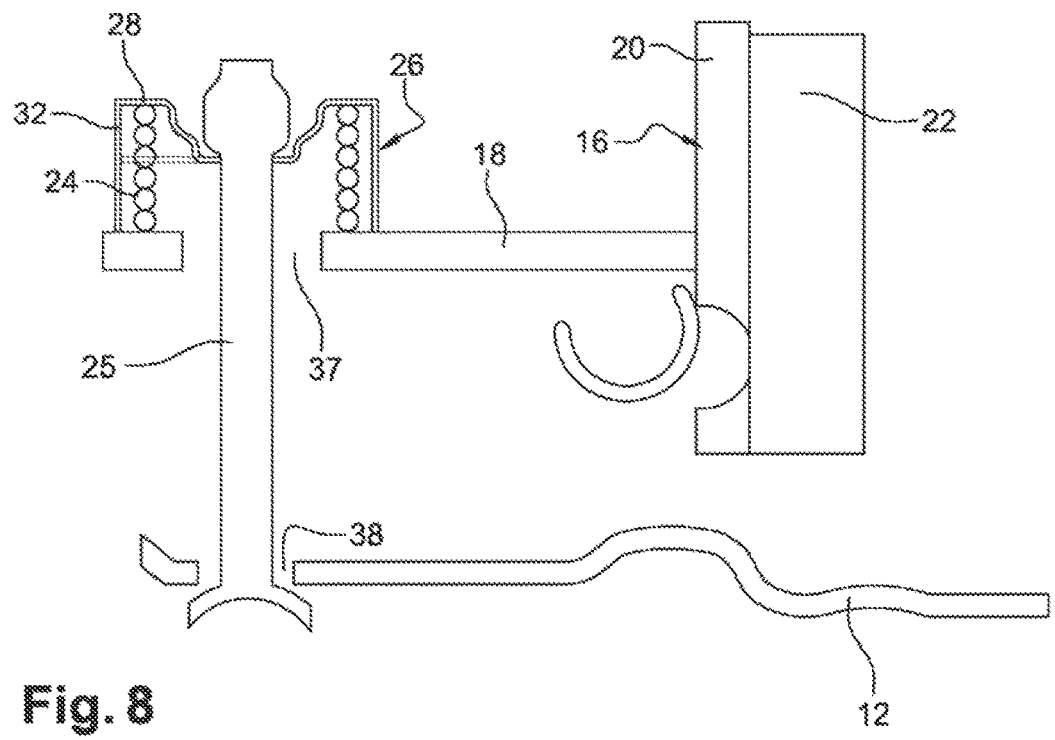

An embodiment of the invention is described below with reference to the following figures:

FIG. 1 is a perspective view of a drum brake according to one embodiment of the invention, FIG. 2 is a perspective view of a member used to hold a segment in relation to a plate in said brake, FIGS. 3 to 6 are top and side views of the member respectively, and FIGS. 7 and 8 are cross sections of a portion of the brake, showing two stages of operation.

FIG. 1 shows a drum brake 10 according to one embodiment of the invention. The brake includes a circular plate 12 used to hold the other parts of the brake. The plate 12 carries a wheel cylinder 14 controlled by the control system of the brake. In this case, it is a hydraulic control system. Nonetheless, the invention can also be applied to an electronic or mechanical control system.

The plate 12 also carries two segments 16 that are symmetrical in relation to one another about a midplane of the plate 12. Each segment 16 comprises a core 18 and a rim 20. The core 18 is flat, parallel to the plate and articulated with the cylinder 14. The rim 20 is curved and perpendicular to the plate. It bears a brake lining 22 produced using a friction material. The curved shape of the lining 22 is the same as the curved shape of the rim 20 carrying same.

Moreover, the two segments 16 are held in relation to one another in particular by a holding spring 23 with an axis parallel to the plate 12. When a user releases the brake pedal, the springs 23 retract the segments 16 from a position in which same press the brake lining 22 against the drum to the position illustrated in FIG. 1, in which they are removed and do not brake the vehicle.

The core 18 of the segment 16 is held in position in the axial direction perpendicular to the plate 12 by a spring 24, a prestressing stud 25 and a member 26 shown in FIGS. 2 to 6.

The member 26 includes a washer 28 having a recess in the center of same provided with a substantially rectangular central opening 30 advantageously in the shape of the top of a brake. The member 26 also has axial stop means such as a cylindrical skirt 32 provided with two substantially rectangular side openings 34 that are arranged symmetrically in relation to one another about a central axis of the member. The skirt is rigidly attached to the washer 28 and forms a single part with same. The skirt also has two narrow long linear openings 36 extending in a direction parallel to the central axis of the skirt. Each opening is positioned on a respective face of the skirt also having a side opening 34. The member 26 is advantageously made of stamped and/or folded steel sheet. As shown in FIGS. 1, 7 and 8, the spring 24 is positioned inside the member 26, surrounded by the skirt 32 and beneath the washer 28. The central axis of the spring matches the central axis of the member 26. The spring 24 bears against the core 18 and against the washer 28 via the respective extremities of same.

Figure 3:
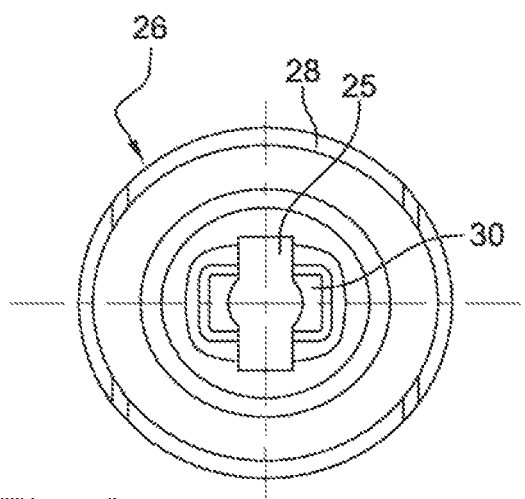
Figure 4:
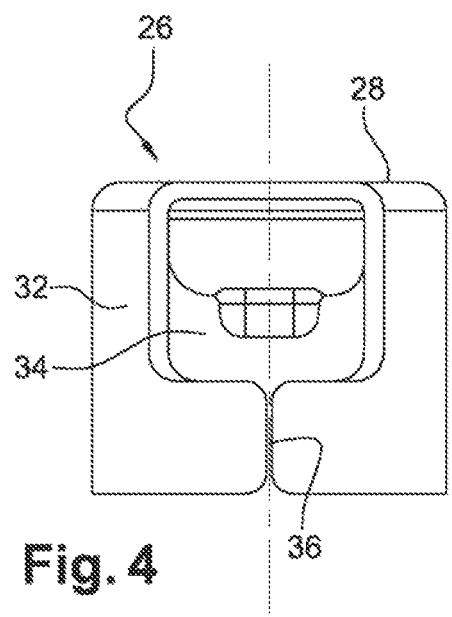
Figure 5:
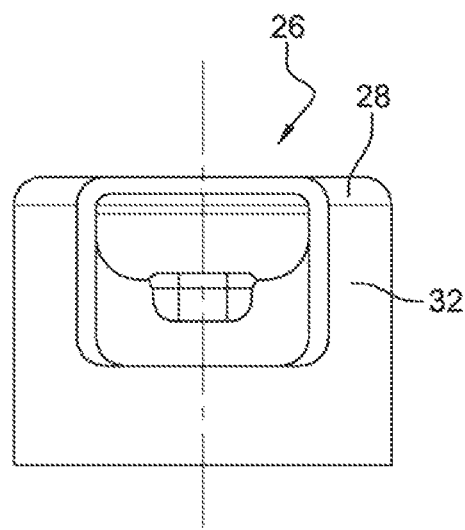
Figure 6:
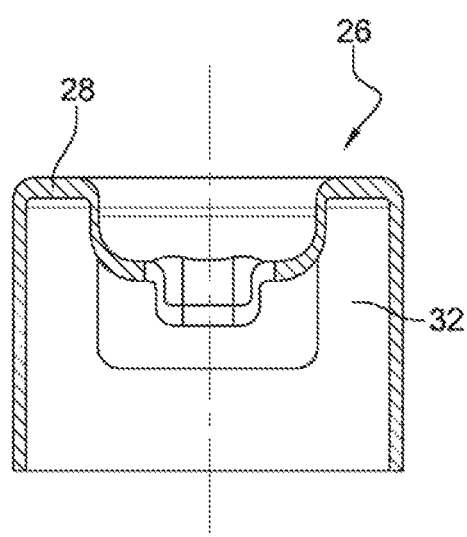

A stud 25 extends along the central axis of the spring 24 and of the member 26. As shown in FIGS. 3, 7 and 8, one extremity of the rod has a rectangular-section head that can pass through the opening 30, having substantially the same dimensions as said opening. Thus, to immobilize the rod 25 along the main axis of the member with the head of same protruding beyond the washer, the head of the stud is passed through the opening, then the stud is rotated by one quarter turn about the main axis of the skirt, as shown in FIG. 3.

Furthermore, as shown in FIGS. 7 and 8, the core 18 of the segment 16 has an opening 37 through which the stud 25 extends. This letter is linked to the plate 12 by passing through an opening 38 located on the plate 12. The diameter of this opening is less than the diameter of one extremity of the stud 25. Thus, this extremity of the stud cannot come out of the opening 38 in the plate 12.

Operation of the mechanism for holding the segment 16 using the assembly comprising the spring 24, the stud 25 and the member 26 is described below with reference to FIGS. 7 and 8.

Under normal usage conditions, the segment 16 is in contact with the plate 12 at a distance D of between 0 and 5 mm, preferably between 0.5 and 4 mm, and more preferably between 1 and 3 mm, typically of 1, 2 or 3 mm from one extremity arranged facing the skirt 32. As shown in FIG. 7, the skirt 32 of the member 26 does not bear against the core 18 of the segment 16 and is separated from this latter. The spring 24 is in the idle position of same.

If the wheel bearing the brake 10 is subject to a lateral impact or the sudden repeated application of the handbrake while the vehicle is in motion, the segment 16 is caused to move in a direction normal to the plate in translation towards the member 26, as shown in FIG. 8. The core 18 then butts against one extremity of the skirt 32. As such, the length of the skirt along the main axis of same defines an end-of-travel position for the segment 16. This position is selected to protect the braking system. Indeed, in the position shown in FIG. 8, one extremity of the segment 16, referred to as the segment tip, is always in contact with the piston corresponding to the wheel cylinder 14, thereby preventing same from coming out during hydraulic application.

Furthermore, the spring 24 is then in a compressed position. Subsequently, when the user ceases to apply any hydraulic and/or mechanical pressure, it returns the core 18 to the initial position of same, as shown in FIG. 7.

Naturally, numerous modifications may be made to the invention without thereby moving outside the scope of same.

NOMENCLATURE

10: drum brake
12: plate
14: wheel cylinder
16: segment
18: core
20: rim
22: brake lining
23: holding spring
24: spring
25: prestressing stud
26: member
28: washer
30: central opening
32: cylindrical skirt
34: side opening
36: long linear opening
38: opening in the plate

The invention claimed is:

1. A drum brake, comprising:
   a plate;
   at least one segment including a core and a brake lining;
   a spring configured to keep the core of the segment in an axially balanced position;
   means for prestressing the spring in a prestressing direction; and
   stop means configured to limit an ability of the core of the segment to move axially in a stopping direction,
   wherein the stop means and the prestressing means are separate parts,
   wherein the stop means include an axial skirt outside the spring and extending in an axial direction that is parallel to an axis of the spring,
   wherein the stop means include a washer rigidly attached to the axial skirt,
   wherein the stopping direction is the same as the prestressing direction and the axial direction,
   wherein the axial skirt has a length in the axial direction that is equal to or greater than a compressed length of the spring in the axial direction, the compressed length being a length of the spring in the axial direction concurrently with the spring being at least partially compressed in the axial direction,
   wherein,
      the prestressing means include a stud anchored to the plate by a first extremity, a second extremity of which defines an end-of-travel position for the washer,
      the spring contacts the washer at a spring contact point of the washer,
      the stud contacts the washer at a stud contact oint of the washer, and
      the washer includes a central recess, and the stud contact point is at the central recess, such that the spring contact point is distal from the core in relation to the stud contact point in the axail direction.

2. The brake as claimed in claim 1, wherein the axial skirt and the washer form a single part.

3. The brake as claimed in claim 1, wherein the washer and one extremity of the stud have matching shapes.

4. The brake as claimed in claim 1, wherein the stud extends along the axis of the axial skirt.

5. The brake as claimed in claim 1, wherein the axial skirt surrounds the spring.

6. The brake as claimed in claim 1, wherein the axial skirt has an opening at one extremity thereof opposite to the washer.

7. The brake as claimed in claim 1, wherein the stop means and the prestressing means are made of folded and/or stamped steel sheet.

8. A drum brake, comprising:
   a plate;
   at least one segment including a core and a brake lining;

a spring configured to keep the core of the segment in an axially balanced position; and a prestressing assembly configured to prestress the spring in a prestressing direction; and a stopper configured to limit an axial movement of the core of the segment in a stopping direction, wherein the stopper and the prestressing assembly are separate parts, wherein the stopper includes an axial skirt outside the spring and extending in an axial direction that is parallel to an axis of the spring, wherein the stopper includes a washer rigidly attached to the axial skirt, wherein the stopping direction is the same as the prestressing direction and the axial direction, wherein the axial skirt has a length in the axial direction that is equal to or greater than a compressed length of the spring in the axial direction, the compressed length being a length of the spring in the axial direction concurrently with the spring being at least partially compressed in the axial direction, wherein, the prestressing assembly include a stud anchored to the plate by a first extremity, a second extremity of which defines an end-of-travel position for the washer, the spring contacts the washer at a spring contact point of the washer, the stud contacts the water at a stud contact point of the washer, and the washer includes a central recess, and the stud contact point is at the central recess, such that the spring contact point is distal from the core in relation to the stud contact point in the axial direction.

9. The brake as claimed in claim 8, wherein the axial skirt and the washer form a single part.

10. The brake as claimed in claim 8, wherein the washer and one extremity of the stud have matching shapes.

11. The brake as claimed in claim 8, wherein the stud extends along the axis of the axial skirt.

12. The brake as claimed in claim 8, wherein the axial skirt surrounds the spring.

13. The brake as claimed in claim 8, wherein the axial skirt has an opening at one extremity thereof opposite to the washer.

14. The brake as claimed in claim 8, wherein the stopper and the prestressing assembly include a folded and/or stamped steel sheet.

* * * * *